United States Patent [19]

Kobelt et al.

[11] 4,121,697
[45] Oct. 24, 1978

[54] CAM ACTUATED CALIPER BRAKE ASSEMBLY

[75] Inventors: Jacob Kobelt, 6100 Oak St., Vancouver, B. C., Canada, V6M 2W2; Helmut Edward Fandrich, Vancouver, Canada

[73] Assignee: Jacob Kobelt, Vancouver, Canada

[21] Appl. No.: 727,688

[22] Filed: Sep. 29, 1976

[51] Int. Cl.² ............................................. F16D 65/16
[52] U.S. Cl. .................................... 188/72.7; 74/110; 188/72.9; 192/70.24; 192/93 R
[58] Field of Search ................ 188/72.7, 72.9, 343; 192/70.23, 70.24, 93 R; 74/110

[56] References Cited

U.S. PATENT DOCUMENTS

| 343,680 | 6/1886 | Tribe | 188/72.7 |
| 1,751,646 | 3/1930 | Nieman | 74/110 |
| 2,162,775 | 6/1939 | Dick | 188/343 X |
| 2,791,123 | 5/1957 | Thomsen | 74/110 |
| 3,628,639 | 12/1971 | Daley, Jr. | 188/73.3 |
| 3,929,209 | 12/1975 | Peckham, Jr. | 188/72.7 |
| 3,986,584 | 10/1976 | Wright et al. | 188/72.7 X |

FOREIGN PATENT DOCUMENTS 1,755,823  8/1971  Fed. Rep. of Germany ......... 188/72.7

Primary Examiner—George E. A. Halvosa
Attorney, Agent, or Firm—Carver and Company

[57] ABSTRACT

Caliper brake assembly using a cam structure to actuate brake shoes to permit selection of a wide range of braking forces and to increase design flexiblity. The assembly has a frame journalling a pair of opposed arms with opposed brake shoes hinged adjacent opposed inner ends of the arms to brake a disc sandwiched between the shoes. The cam structure includes a cam member having a cam surface which cooperates with a brake actuator so that the cam surface is displaced by the actuator. A pair of cam followers cooperate with the respective arms and the cam surface during brake actuation to rotate each arm about a respective hinge axis relative to the frame so as to force the shoes against the disc. In one embodiment the cam member is displaced parallel to the hinge axes and each cam follower includes a swivellably mounted roller to accommodate swinging of the arms. In an alternative embodiment, the cam has double-acting wedges in which the actuator effectively floats between the arms. A lever, or a spring within the actuator, permits the brake to be engaged without fluid pressure thus permitting the brake to be used as a static brake also.

7 Claims, 6 Drawing Figures

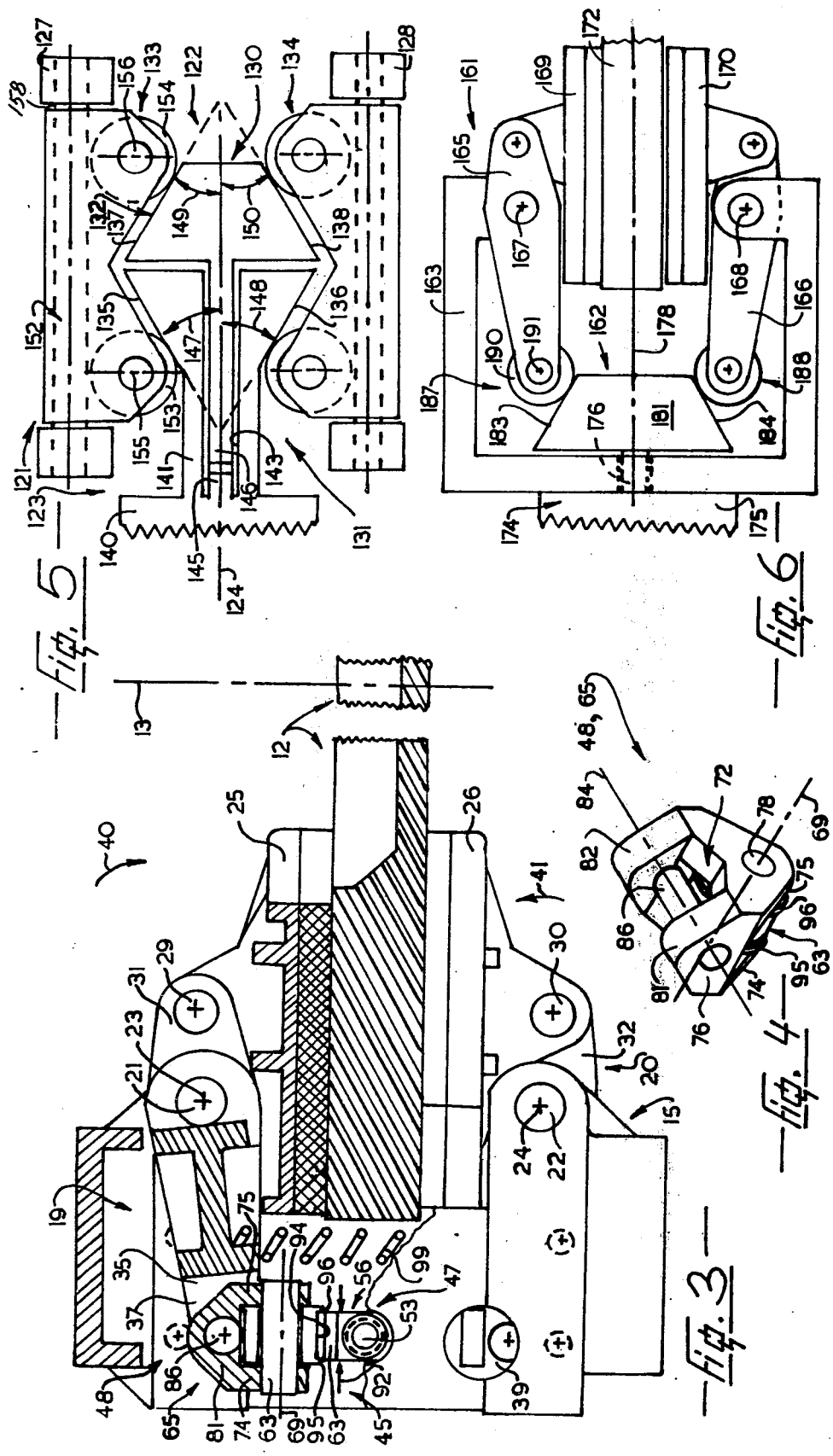

CAM ACTUATED CALIPER BRAKE ASSEMBLY

BACKGROUND OF THE INVENTION

1. Field of the Invention

The invention relates to a caliper brake assembly particularly adapted for use in heavy duty disc brake assemblies such as in winches and cable systems.

2. Prior Art

Caliper brakes have been used for many years in disc brake assemblies in which a pair of opposed arms hinged to a frame carry brake shoes at inner ends thereof and are rotated about a hinge axis by a brake actuator, such as a fluid actuated cylinder, extending between outer ends thereof. Braking force obtained in this type of assembly is proportional to cross-sectional area of the actuator, and ratio of moment arms of the brake shoes and actuator about the hinge axis. It can be seen that, for use in a heavy duty application in which high braking forces are required, a relatively large actuator acting on relatively long arms is needed. In the past, sometimes difficulty has been experienced in accommodating heavy duty calipers in a restricted space because of the size of the components necessary to obtain the required braking force.

Often a disc brake is to be used for dynamic braking only, and a separate mechanically-actuated band brake or drum brake is required for static braking in which the brake is to be locked on or engaged for long periods. This is because adequate braking force can only be obtained with the disc brake by using a pressurized fluid, and where fluid pressure lost in a static brake cannot be tolerated for safety reasons, mechanically actuated brakes are required. Using a second brake for static braking only is costly and aggravates design difficulties when there are severe space limitations in the brake installation.

SUMMARY OF THE INVENTION

The invention reduces difficulties and disadvantages of the prior art by providing a caliper brake cam means which is used in a caliper brake assembly to obtain a wide range of braking forces by using a relatively small actuator with relatively short arms carrying the brake shoes. The brake assembly can be used in heavy or light duty applications, and if desired a lever or spring can be fitted to cooperate with the actuator to permit mechanical application and locking of the brake. Thus the assembly of the invention can be used as a dynamic or static brake, thus eliminating the additional drum or band brake commonly used with a static brake. Furthermore, the invention can be used in several configurations which facilitate designing a brake assembly for use in a restricted space.

A caliper brake assembly for use with the invention has a frame, a brake actuator, a pair of arms hinged to the frame for rotation about parallel hinge axes, and a pair of opposed brake shoes hinged adjacent opposed inner ends of the arms and adapted to brake a member, such as a brake disc, sandwiched between the shoes. The caliper brake cam means of the invention includes a cam member and a pair of cam followers. The cam member has at least one cam surface and cooperates with the brake actuator so that the cam surface is displaced when the actuator is actuated. Each cam follower cooperates with a respective arm and contacts the respective cam surface during actuation of the brake so as to rotate each arm relative to the frame to cause the shoes to contact the member.

A detailed disclosure following, related to drawings, describes preferred embodiments of the invention, which is capable of expression in structure other than that particularly described and illustrated.

DESCRIPTION OF THE DRAWINGS

FIG. 3 is a simplified fragmented section taken generally on line 3—3 of FIG. 2, some portions being omitted, FIG. 4 is a perspective of a portion of a cam means, FIG. 5 is a fragmented schematic of an alternative cam means of a caliper brake assembly, some portions being omitted, FIG. 6 is a simplified schematic of a second alternative caliper brake assembly, some portions being omitted.

DETAILED DISCLOSURE

FIGS. 1 through 4

Figure 1:
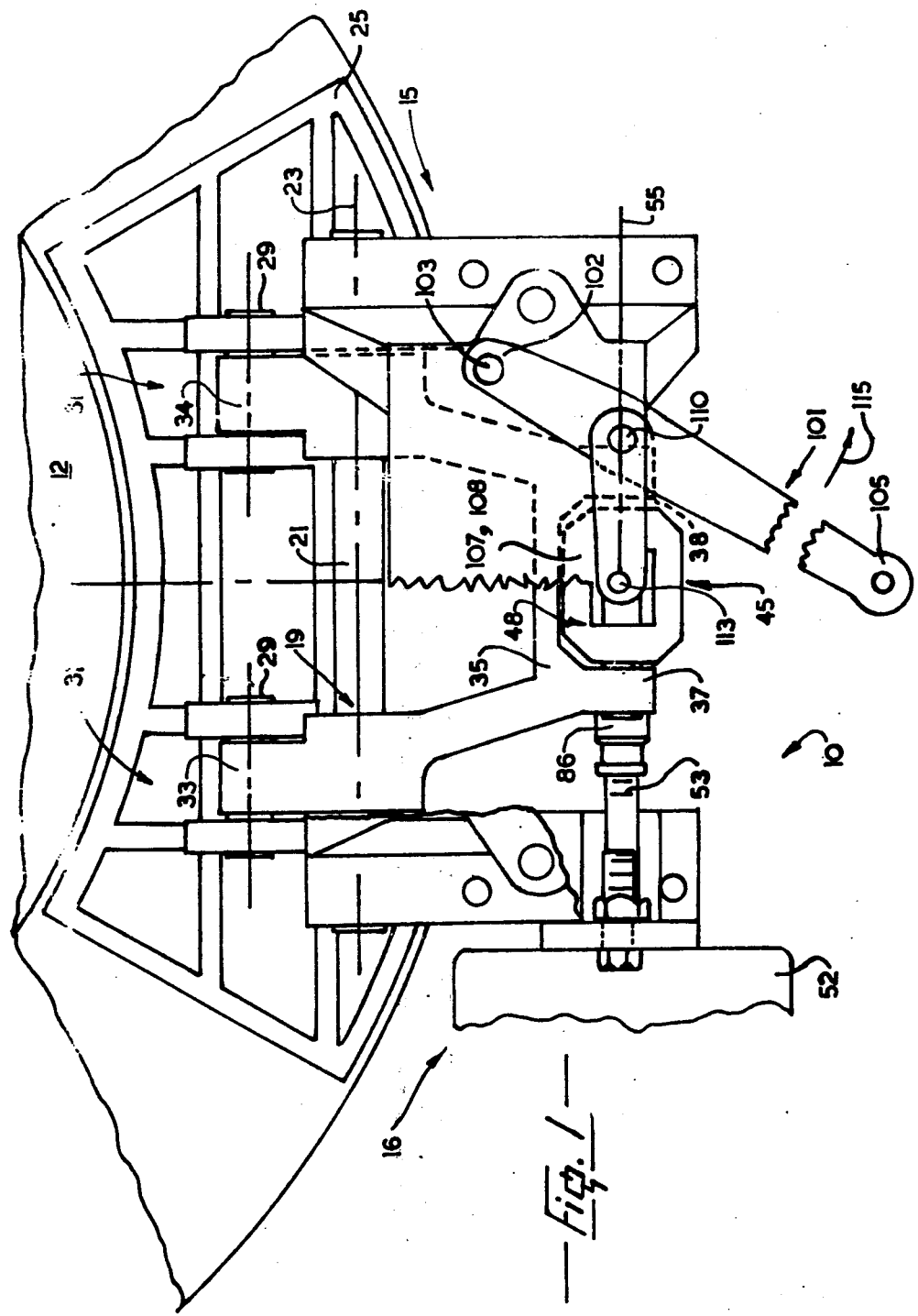
FIG. 1 is a simplified fragmented top plan of a caliper brake assembly fitted with a caliper brake cam means according to the invention, some portions being omitted and a portion of a brake disc being shown.
Figure 2:
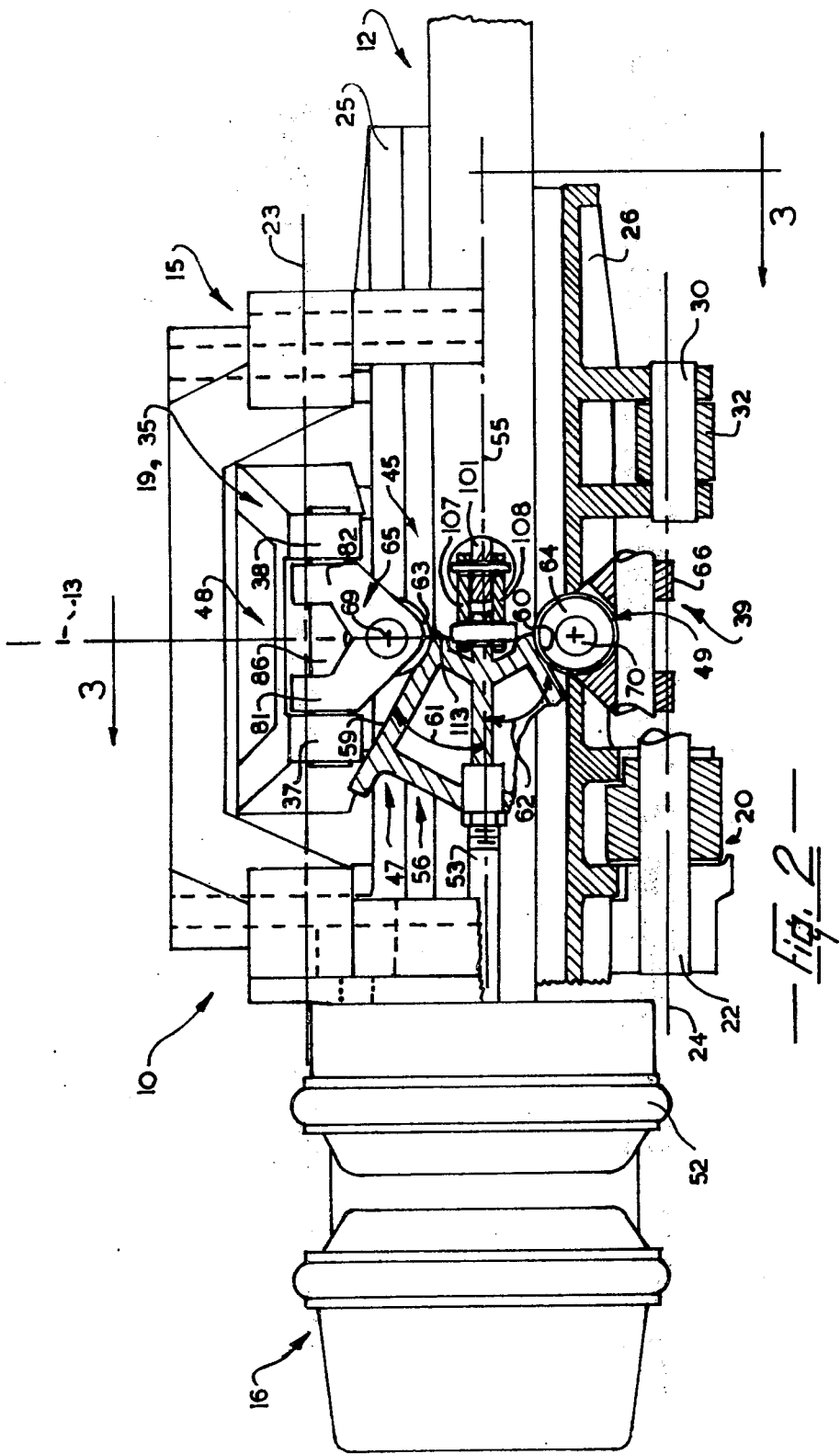
FIG. 2 is a simplified fragmented front elevation of the assembly of FIG. 1, some portions being omitted to show hidden detail.

Referring mainly to FIGS. 1–3, a caliper brake assembly 10 according to the invention is adapted to brake a disc 12 mounted for rotation about a disc axis 13, which disc thus serves as a member to be braked. The assembly has a frame 15 and a brake actuator 16 mounted on the frame, the brake actuator being a conventional pneumatic diaphragm cylinder as used in common truck and trailer air brake assemblies. The cylinders can be either a fail-safe spring-applied type or a non-spring type with advantages as will be described. The assembly 10 includes a pair of similar arms, namely first and second arms 19 and 20, hinged to the frame on hinge pins 21 and 22 for rotation about parallel hinge axes 23 and 24. First and second opposed brake shoes 25 and 26 are hinged on aligned first and second shoe hinge pin pairs 29 and 30 adjacent opposed inner ends 31 and 32 of the arms 19 and 20. As best seen in FIG. 1, the arm 19 is bifurcated and at the inner 31 has a pair of opposed spaced inner end portions 33 and 34 with aligned undesignated bores to carry the hinge pin pair 29. The arm 19 has an outer end 35 spaced on a side of the hinge axis 23 remote from the shoe 25, the end 35 having a pair of spaced similar mounting lugs 37 and 38. For convenience of definition the terms "inner" and "outer" refer to portions of the assembly with respect to the disc axis 13, inner portions being closer to the axis than outer portions. The second arm 20 is generally similar to the arm 19 and has a bifurcated inner end 32 and an outer end 39 disposed on a side of the hinge axis remote from the second shoe 26.

The above description also relates to a relatively conventional disc brake assembly in which, with reference to FIG. 3, rotation of the arms 19 and 20 in direction of arrows 40 and 41 respectively causes the shoes 25 and 26 to approach each other so as to squeeze the brake disc 12 between the shoes to brake the disc against rotation. In a conventional prior art assembly, a brake actuator such as a fluid or air actuated cylinder extends directly between the outer ends 35 and 39 of the arms, so that extension of the cylinder rotates the arms as above to actuate the brake. In the present invention the fluid or air actuated cylinder is removed from the ends of the arms and a cam means 45 according to the invention is substituted. The means 45 includes a cam member 47 and first and second cam followers 48 and 49, and the brake actuator, such as the actuator 16, is removed from the arms and repositioned to cooperate therewith. The actuator 16 has a cylinder portion 52 mounted on the frame and a rod portion 53 extending therefrom such that when the actuator is actuated the rod moves along an axis of extension 55 of the actuator. The cam member 47 includes a wedge portion 56 having two equally inclined first and second cam surfaces 59 and 60, the portion 56 being mounted on an outer end of the rod portion so that actuation of the actuator moves the cam member along the axis 55. The cam surfaces 59 and 60 are inclined at angles 61 and 62 to direction of displacement of the cam member 47, namely the axis 55. Thus, to brake the disc, the cam member cooperates with the brake actuator 16 so that when the actuator is actuated the cam surfaces are displaced along a direction of displacement of the cam member. The cam followers 48 and 49 cooperate with respective arms 19 and 20 and contact the cam surfaces 59 and 60 during actuation of the brake. Thus as the rod portion 53 extends from the actuator 16, the cam followers are displaced away from the axis 55 to rotate each arm relative to the frame to cause the shoes 25 and 26 to contact the braked member.

The cam followers 48 and 49 include similar first and second rollers 63 and 64 and similar roller mounts 65 and 66 respectively, each roller being journalled for rotation in its respective roller mount about respective roller axes 69 and 70 disposed normally to the hinge axes 23 and 24 respectively. The roller mounts 65 and 66 are similar and thus only the roller mount 65 will be described. With particular reference to FIG. 4, the mount 65 includes a yoke member 72 having a pair of roller lugs 74 and 75 and a central portion 76, the lugs extending from the central portion and being spaced apart sufficiently to accept the roller 63 therebetween. The roller lugs have undesignated aligned roller spindle bores at outer ends thereof concentric with the roller axis 69, a roller spindle 78 passing through the roller spindle bores and journalling the roller between the roller lugs 74 and 75. The yoke member 72 also includes a pair of arm lugs 81 and 82 extending from a side of the central portion 76 remote from the roller lugs and having undesignated aligned mount bores concentric with a mount hinge axis 84. The axis 84 is disposed normally to the roller axis and a mount hinge pin 86 passes through the bores to journal the roller mount to the outer end of the arm 19. As best seen in FIG. 2, the spaced mounting lugs 37 and 38 at the outer end 35 are spaced apart sufficiently to accept the roller mount 65 therebetween, and have undesignated aligned bores to accept the mount hinge pin 86 for journalling the roller mount to the outer end of the arm.

As best seen in FIGS. 3 and 4, the first cam surface 59 of the wedge portion 56 has a width 92 and is flat. The roller 63 has a recessed roller surface 94 which has a width defined by raised rims 95 and 96 which are spaced apart to accept the cam surface therebetween. The rims thus straddle the cam surface and aid in tracking of the roller on the cam surface as the cam member 56 moves along the axis 55. It can be seen that, as the roller rolls on the cam surface 59 and the arm 19 rotates about the hinge axis 23 in direction of arrow 40, the roller mount 65 rotates slightly on the mount hinge pin 86 to accommodate the change in angle of the cam surface relative to the arm 19. Thus, when the direction of displacement of the cam member is parallel to the hinge axis 23, to maintain the surface 94 of the roller 63 parallel to the cam surface, the roller axis 69 rotates or swivels relative to the hinge axis 23. The roller mount is thus journalled for rotation on the arm about an axis disposed parallel to the hinge axis so as to mount the roller swivellably to accommodate swinging of the arms. The second arm 20 similarly cooperates with the roller mount 66 so that rotation of the arms 19 and 20 are simultaneous and in opposite directions so as to apply the brakes equally. A relatively light tension spring 99 extends between the outer ends of the arms so as to draw the ends towards each other to disengage the brake when the cam member is retracted by the rod portion 53.

As previously stated, the actuator 16 can be a failsafe spring-applied type in which, when air pressure in the actuator is reduced below a pre-determined amount, a heavy internal spring within the actuator, not shown, extends the rod portion 53 and actuates the cam means 45 to engage the brake, ie. spring applied brake. This type of actuator is commonly used in heavy commercial truck or trailer parking brakes and force available from the spring is usually within a range of 50 to 80 percent of normal force available when air is used, the actual force being dependent on spring extension. If sufficient spring strength and mechanical advantage are available, this structure could clearly serve as a static and a dynamic brake.

Alternatively, if a non-spring type actuator is used, an alternative mechanism can be used to actuate the cam means. One such means is shown in FIG. 1 in which a lever 101 has an inner end 102 hinged to the frame on a lever hinge pin 103, and an outer end 105 for actuation by suitable mechanical means or for gripping by an operator. A pair of spaced parallel connecting links 107 and 108 are hinged at adjacent inner ends to a connector hinge pin 110 carried in the handle 101 and at adjacent outer ends to a cam pin 113. Thus the arm 101 is connected to the cam means so that rotation of the lever 101 about the inner end 102 in direction of an arrow 115 causes the connecting links 107 and 108 to draw the cam member 47 along the axis 55, thus drawing the rod 53 outwards and producing an axial movement of the cam member identical to that when the brake actuator is actuated. Thus the lever 101 is hinged to the frame and cooperates with the cam member so that swinging of the lever moves the cam member to actuate the cam means which actuates the brake.

The lever 101 provides a mechanical advantage to multiply force applied to the outer end 105, the multiplication factor being dependent on spacing of the connector hinge pin 110 relative to the ends. Clearly, by suitable selection of the spacings above, a large mechanical advantage can be obtained permitting application of the brake by hand. This could be advantageous if there were a fluid pressure failure and the actuator 16 were not a fail-safe type. Also suitable lock means (not shown) can be incorporated to hold the lever in the "on" position to permit the brake to be engaged indefinitely, thus permiting a non-fail-safe type of actuator to serve as a static brake. Thus the lever 101 can serve as a means of actuating the brake by means other than the actuator 16, and, with locking means can be used to hold the brake engaged.

Thus, if a fail-safe spring applied actuator, or a non-fail-safe actuator with the lever and locking means are used with the present cam means, the separate static brake frequently used with common disc brakes can be eliminated.

OPERATION

In operation, actuating fluid under pressure is fed to the actuator 16 which causes the rod portion 53 to extend outwards from the cylinder portion 52 to move the cam member 47 along the axis 55. The rollers 63 and 64 roll up the cam surfaces 59 and 60 and swing the arms 19 and 20 to apply the brakes. To disengage the brake, the actuator is retracted and the procedure above is reversed. The lever 101 can be used to apply the brake and the cam means 45 operates in a manner identical to that when the actuator is operated.

ALTERNATIVES AND EQUIVALENTS

In FIG. 2, the cam surfaces 59 and 60 are shown plane and inclined to the axis 55 at constant equal angles 61 and 62. If desired the cam surfaces could be non-plane, ie. convex, concave or with some other profile so as to vary force on the outer end of the arm as the wedge member extends further from the actuator. This could compensate to some extent for brake lining wear if needed. Clearly the angles 61 and 62 could be reversed so that retraction of the actuator engaged the brake. Similarly, the actuator, cam member and cam follower could be duplicated so that each arm has two cam followers which are acted on by two cam members moved by two actuators, ie. one actuator on each side of the frame cooperating independently with a respective cam means. A cam member having one cam surface only cooperating with the two cam followers could similarly be devised. These alternatives are not shown.

FIG. 5

Portions of a first alternative brake assembly 121 are shown schematically only, the assembly having an alternative cam means 122 according to the invention. The brake assembly has a frame (not shown) generally similar to the frame 15 of FIG. 1, and first and second arms 127 and 128 journalled for rotation about the frame and cooperating with brake shoes (not shown) at inner ends thereof, and the alternative cam means 122 at outer ends thereof. An actuator 123 has an axis of extension 124 disposed parallel to hinge axes of the arms 127 and 128 (not shown).

The cam means 122 includes a cam member 130 having first and second cam elements or wedge portions 131 and 132, and first and second cam followers 133 and 134. The followers 133 and 134 cooperate with outer ends of the arms 127 and 128 and are in contact with the cam members during actuation of the brake as will be described. The cam element 131 has a pair of oppositely disposed cam surfaces 135 and 136, and the element 132 has similarly oppositely disposed cam surfaces 137 and 138. The actuator has a cylinder portion 140 having a hollow strut 141 extending therefrom and connected to the first cam element 131, the strut having a passage 143 concentric with the axis 125. The actuator has a complementary rod portion 145 having a connecting rod 146 connected to the second cam element 132, the connecting rod passing through the passage 143 of the hollow strut. The cam surfaces 135 and 136 of the first cam element 131 are inclined at equal but opposite angles 147 and 148 to the direction of displacement of the cam member, that is to the axis 124. The surfaces 137 and 138 of the element 132 are similarly inclined at angles 149 and 150, which are equal but disposed oppositely to the angles 147 and 148. It can be seen that the pair of cam surfaces of the first wedge portion is inclined oppositely to the adjacent pair of cam surfaces of the second wedge portion, so that the wedge portions are effectively disposed back-to-back. Actuation of the actuator extends the rod portion in one direction and the cylinder portion moves in an opposite direction as a reaction, thus moving the cam element 131 away from the cam element 132 along the axis 124. The actuator 174 thus effectively floats relative to the frame and forces on the cam followers can be effectively balanced. In most positions of the actuator guides, not shown, are used to support the actuator for movement along the 124 to permit floating of the actuator.

The cam followers 133 and 134 are generally similar and thus only the cam follower 133 will be described. The cam follower 133 has a roller mount 152 journalling a pair of similar rollers 153 and 154 to rotate about spaced parallel roller axis 155 and 156 respectively which are disposed normally to the hinge axis (not shown) of the arm 127. The rollers 153 and 154 contact the cam surfaces 135 and 137 respectively so that as the wedge portions move relative to each other the rollers concurrently roll on the respective cam surfaces th swing the arm 127. The roller mount 152 is journalled to the outer end of the arm 127 on a mount hinge pin 158 so as to swivellably mount the rollers to accommodate swinging of the arm 127, in a manner similar to the previously described roller mounts. The cam means 122 has a particular advantage that higher forces on the arms can be obtained for a similar cam member travel, and forces between the wedges and rollers are effectively balanced by the back-to-back disposed wedges. Thus oblique or lateral reactions on the ends of the arm due to the angles of the cam surfaces are essentially balanced. The wedge portions 131 and 132 could be reversed so that adjacent cam surfaces are inclined at opposite angles to those shown, so that retraction of the rod into the actuator actuates the brake.

FIG. 6

A second alternative caliper brake assembly 161 has an alternative cam means 162, a frame 163, shown schematically, and first and second arms 165 and 166 hinged for rotation on hinge pins 167 and 168 carried on the frame 163. First and second brake shoes 169 and 170 are hinged adjacent opposed inner ends of the arms and adapted to brake a disc 172 sandwiched therebetween. A brake actuator 174 has a cylinder portion 175 secured to the frame and a rod portion 176 extending along an axis of extension 178 of the actuator.

The cam means 162 includes a cam member 181 having a wedge portion having a pair of opposed cam surfaces 183 and 184 inclined to the axis 178, which axis defines the direction of displacement of the cam member. It is seen that the direction of displacement of the cam member is normal to the hinge axes of the pins 167 and 168 and, for a symmetrically disposed assembly, the axis 178 intersects an axis of rotation of the disc 172, not shown. The cam means 162 also includes a pair of cam followers 187 and 188 cooperating with the arms 165 and 166 and being in contact with the cam surfaces 183 and 184 respectively. The cam follower 187 is a roller 190 journalled for rotation adjacent an outer end of the arm about an axis 191 disposed parallel to the hinge axis.

The cam follower 188 is similar to the follower 187 and thus it can be seen that extension of the actuator so that the wedge 181 moves inwardly towards the disc forces the outer ends of the arms apart and rotates the arms about the hinge pin 167 and 168 so as to actuate the brake. Clearly the cam member 181 could be reversed so that the cam surfaces are inclined at opposite angles, so that retraction of the rod portion 166 rotates the arms so as to actuate the brake.

In the embodiment of FIGS. 1 through 4, the axis 55 of the brake actuator is parallel to the hinge axis 21. That is the movement of the cam member is generally parallel to a local movement of the brake disc, which is defined as tangential disposition of the actuator. This has advantage in some locations where there is little clearance at the edge of the disc and a radially disposed actuator would interfere with adjacent structure. In the alternative structure of FIG. 6 the brake actuator is disposed radially relative to the disc which could be advantageous in some applications where there is clearance to provide a radially extending actuator which might require excessive clearance to accommodate stroke of the cam member. In all embodiments of the invention, a wide range of braking forces can be obtained by selection of stroke of the actuator, ratios of the arms relative to hinge pins etc. and angles of the wedges.

We claim:

1. A caliper brake cam means for use in a caliper brake assembly in which the assembly includes: a frame; a pair of arms hinged to the frame for rotation about parallel hinge axes; a pair of opposed brake shoes hinged adjacent opposed inner ends of the arms and adapted to brake a braked member sandwiched between the shoes; and a brake actuator mounted on the frame and having a cylinder portion having a hollow strut with a passage extending therefrom, and a complementary rod portion having a connecting rod passing through the passage of the hollow strut; the caliper brake cam means being characterized by:
   (a) a cam member having two cam elements including first and second wedge portions each with respective pairs of cam surfaces, a pair of cam surfaces of the first wedge portion being inclined oppositely and at equal angles to adjacent pairs of cam surfaces of the second wedge portion so that the wedge portions are effectively disposed back-to-back, the cam surfaces being inclined at equal but opposite angles to the direction of displacement of the cam members; the first wedge portion being connected to the connecting rod and the second wedge portion being connected to the cylinder portion of the actuator, so that when the actuator is actuated the wedge portions move in opposite directions, the direction of displacement of the cam member being parallel to the hinge axis,
   (b) each cam follower includes a roller mount and a pair of rollers, each roller mount being journalled for rotation about an axis disposed parallel to the hinge axis, and each roller contacting a respective cam surface of the respective wedge portion, the pair of rollers of each cam follower being journalled for rotation in the roller mount about roller axes disposed normally to the hinge axis of the respective arm, so that as the wedge portions move relative to each other the rollers concurrently roll on the adjacent cam surfaces to actuate the brake.

2. A caliper brake cam means for use in a caliper brake assembly in which the assembly includes: a frame, a brake actuator, a pair of arms hinged to the frame for rotation about a parallel hinge axis, and a pair of opposed brake shoes hinged adjacent opposed inner ends of the arms and adapted to brake a braked member sandwiched between the shoes, the caliper brake cam means being characterized by:
   (a) a cam member cooperating with the brake actuator so as to be displaced in a direction parallel to the hinge axis when the actuator is actuated, the cam member having two cam surfaces inclined to the direction of displacement of the cam member,
   (b) a pair of cam followers, each follower cooperating with and being mounted adjacent to an outer end of a respective arm and including a roller and a roller mount, the roller being journalled for rotation in the roller mount about a roller axis disposed normally to the hinge axis of the arm, the roller mount being journalled for rotation on the arm about an axis disposed parallel to the hinge axis so as to mount the roller swivellably, so that the rollers contact the respective cam surfaces during actuation of the brake so as to rotate each arm relative to the frame to cause the shoes to contact the brake member.

3. A caliper brake cam means as claimed in claim 2 in which:
   (a) the cam member includes two cam elements, each cam element having a pair of oppositely disposed cam surfaces inclined at equal but opposite angles to the direction of displacement of the cam member, the cam elements cooperating with complementary portions of the actuator, so that when the actuator is actuated the cam elements move in opposite directions.

4. A caliper brake cam means as claimed in claim 3 in which:
   (a) said two cam elements form first and second wedge portions having said oppositely disposed cam surfaces,
   (b) the actuator has: a cylinder portion having a hollow strut extending therefrom and connected to the first wedge portion, the strut having a passage; and a complementary rod portion having a connecting rod connected to the second wedge portion, the connecting rod passing through the passage of the hollow strut,
   (c) each cam follower has a pair of rollers, each roller contacting a respective cam surface of the respective wedge portion so that as the wedge portions move relative to each other the rollers concurrently roll on the adjacent cam surfaces to actuate the brake.

5. A caliper brake cam means as claimed in claim 2 in which:
   (a) the actuator has a cylinder portion mounted on the frame and a rod portion extending therefrom in the direction of displacement of the cam member,
   (b) the cam member includes a wedge portion having two equally inclined cam surfaces and being mounted on the rod portion.

6. A caliper brake cam means as claimed in claim 2 in which the roller mount includes:
   (a) a yoke member having a pair of roller lugs, a pair of arm lugs and a central portion, the roller lugs extending from the central portion and being spaced apart to accept the roller therebetween, the roller lugs having aligned roller spindle bores at outer ends thereof concentric with the roller axis, the arm lugs extending from a side of the central portion remote from the roller lugs and having aligned mount bores concentric with a mount hinge axis disposed normally to the roller axis to accept a mount hinge pin for journalling the roller mount to the outer end of the arm, (b) a roller spindle passing through the roller spindle bores and journalling the roller thereon between the lugs.

7. A caliper brake cam means as claimed in claim 2 further including:
(a) a lever hinged to the frame and cooperating with the cam member, so that swinging of the lever moves the cam member to actuate the cam means.

* * * * *